(12) United States Patent
Bouchard et al.

(10) Patent No.: US 8,149,441 B2
(45) Date of Patent: Apr. 3, 2012

(54) EXPECTED TIME TO COLLECT A PRINT JOB

(75) Inventors: Guillaume Bouchard, Bernin (FR); Stefania Castellani, Meylan (FR); Maria Antonietta Grasso, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1028 days.

(21) Appl. No.: 12/100,810

(22) Filed: Apr. 10, 2008

(65) Prior Publication Data

US 2009/0257081 A1    Oct. 15, 2009

(51) Int. Cl.
  *G06F 15/00*    (2006.01)
  *G06F 3/12*    (2006.01)
  *G06K 1/00*    (2006.01)
(52) U.S. Cl. ...................................... 358/1.15; 358/1.13
(58) Field of Classification Search .......................... None
See application file for complete search history.

(56) References Cited

U.S. PATENT DOCUMENTS

| 2002/0054333 A1 | 5/2002 | Yamamoto et al. |
| 2005/0190383 A1 | 9/2005 | Levin et al. |
| 2006/0050304 A1* | 3/2006 | Abe et al. ..................... 358/1.15 |
| 2007/0146772 A1 | 6/2007 | Castellani et al. |

OTHER PUBLICATIONS

F.Bourgeois, et al., An Extension of the Munkres Algorithm for the Assignment Problem to Rectangular Matrices, *Communications of the ACM*, 14(12):802-804, Dec. 1971.
A.Frank, On Kuhn's Hungarian Method—A Tribute from Hungary, *Technical Report 2004-14*, Egrervary Research Group, Pazmany P. Setany 1/C, H1 117, Budapest, Hungary, 2004.
E.Limpert, et al., Log-Normal Distributions Across the Sciences: Keys and Clues, *BioScience*, 51 (5):341352, 2001.
W.Weibull, A Statistical Distribution Function of Wide Applicability, *J. Appl. Mech. Trans.*, ASME, 18(3):293-297, 1951.

* cited by examiner

*Primary Examiner* — Douglas Tran
(74) *Attorney, Agent, or Firm* — Fay Sharpe LLP

(57) ABSTRACT

A time-to-collect measure is disclosed which may be used in generating a model for predicting an expected time-to-collect for print jobs. In the case of incomplete data, an algorithm recovers an optimal assignment of links between submission and collection events which allows a time to collect to be computed for one or more prior print jobs. A printing system may incorporate a time-to-collect system for making decisions based on the measure, such as the scheduling of pending print jobs or planning placement of printers.

31 Claims, 6 Drawing Sheets

EXPECTED TIME TO COLLECT A PRINT JOB

BACKGROUND

The exemplary embodiment relates to systems of shared devices, such as networked printers. It finds particular application in connection with a system and method for providing a measure of the expected time-to-collect a job which has been initiated on one of the shared devices, based on prior data, and to a method for reconstructing prior time-to-collect data for generating such a measure in the case where only partial prior data is available.

Computer networks commonly include several computers which are capable of communicating with each other and with other devices on the network. In an office environment, a limited number of resource devices, typically printers, are shared among several office workers. Such networks derive cost benefits by shared usage of the printers. It is therefore desirable for the shared devices to be appropriately located and used efficiently. There are several measures that are calculated in office environments for assessing whether the services being provided are adequate to meet the needs of users of the network. Examples of such measures include the number of documents being printed, the expected time-to-print a document, and the time to availability of a printer.

None of these measures, however, considers the behavior of a user. In office environments, documents are typically printed in support of work activities that may vary from person to person. Some people tend to use a just-in-time approach to printing, i.e., printing documents just before they are needed, e.g., on the way to a meeting. Other people tend to print before leaving work in order to read the documents later in the day. Others are in the habit of printing several documents during the day and then collecting them in a batch after a number of them have been printed. These examples illustrate that it cannot be assumed that a document is immediately collected once printed. Thus, using one of the existing measures for assessing whether the printers are adequately meeting the needs of the users does not serve the objective of determining whether a printed document is ready for collection when a user wants to collect it. This information, if available, could be useful in assessing how the printer is used, and also in more complex applications, such as in deciding how to reprioritize some print jobs when one job is urgently needed.

The present application provides a new measure based on the time-to-collect a job, such as a print job, and methods for determining it when only partial data is available.

INCORPORATION BY REFERENCE

The following references, the disclosures of which are incorporated herein in their entireties by reference, are mentioned:

U.S. Pub. No. 2005/0190383, entitled ESTIMATING THE TIME TO PRINT A DOCUMENT, by Levin, et al., discloses a method for estimating the time to print a document. The method includes creating statistics related to an estimated time to print the document by a printer driver and estimating a time for printing the document on the printer based upon the statistics.

U.S. Pub. No. 2002/0054333, entitled INFORMATION PROCESSING APPARATUS, PRINT TIME INFORMING METHOD, AND COMPUTER-READABLE MEMORY MEDIUM STORING PROGRAM THEREIN, by Yamamoto, et al., discloses an information processing apparatus and a print time informing method for calculating a time that is required for a printing process before the start of printing and informing the user of the print time.

U.S. Pub. No. 2007/0146772, entitled AUTONOMOUS DECISION-MAKING IN PRINT JOB REDIRECTION, by Castellani, et al., discloses a printing system which includes printers capable of redirecting print jobs to one another. A negotiator associated with each printer negotiates print job redirections for outsourcing print jobs to other printers.

BRIEF DESCRIPTION

In accordance with one aspect of the exemplary embodiment, a method of generating a model for determining an expected time-to-collect for at least one print job includes acquiring event data for submission and collection events related to submitted prior print jobs, the event data including submission event data for a plurality of prior print jobs submitted for printing on a printer comprising, for each submitted print job, a submission time and an identifier which identifies a submitter of the submitted print job, and collection event data comprising a plurality of recorded collection times each of the plurality of collection times corresponding to the collection of at least one prior print job from the printer. The method includes, based on the event data, computing a time-to-collect for at least one of the plurality of submitted prior print jobs and generating a model based on the computed time-to-collect computed for a plurality of prior print jobs, the model configured for outputting an expected time-to-collect based on input submission event data.

In accordance with another aspect of the exemplary embodiment, a computer implemented system for determining an expected time-to-collect for a print job includes a component for acquiring a submission time for the print job and at least one job feature and a model which outputs an expected time-to-collect for the print job based on the acquired submission time and time-to-collect data and job features of prior print jobs.

In accordance with another aspect of the exemplary embodiment, a method for recovering a sequence of print events based on partial observations. The method includes acquiring event data for a plurality of submission events comprising submission times for a plurality of print jobs submitted to a printer via a network which is accessible to a plurality of submitters. The method also includes acquiring event data for a plurality of collection events comprising sensed data representative of times at which print jobs are collected from the printer, the collection times and submission times being acquired in overlapping time windows. In the case where a submitter that collects the print job is not uniquely identified, the acquired submission times and collection times are processed with an algorithm which provides an optimal assignment of links between print events, each of the print events comprising one of a submission event and a collection event. The optimal assignment algorithm takes into consideration a difference in time between each linked pair of submission times where the pair is attributed to the same submitter, and each linked submission time and collection time, where the collection time is later in time than the submission time. Based on the optimal assignment, a sequence of the print events is recovered.

In accordance with another aspect of the exemplary embodiment, a method for computing an expected time-to-collect for a print job includes inputting submission event data for the print job to a model, the submission event data comprising at least one feature of the print job selected from a set of features, the model being one which has been generated from time-to-collect data for prior print jobs and features of the prior print jobs and outputting an expected time-to-collect for the print job.

DETAILED DESCRIPTION

Figure 1:
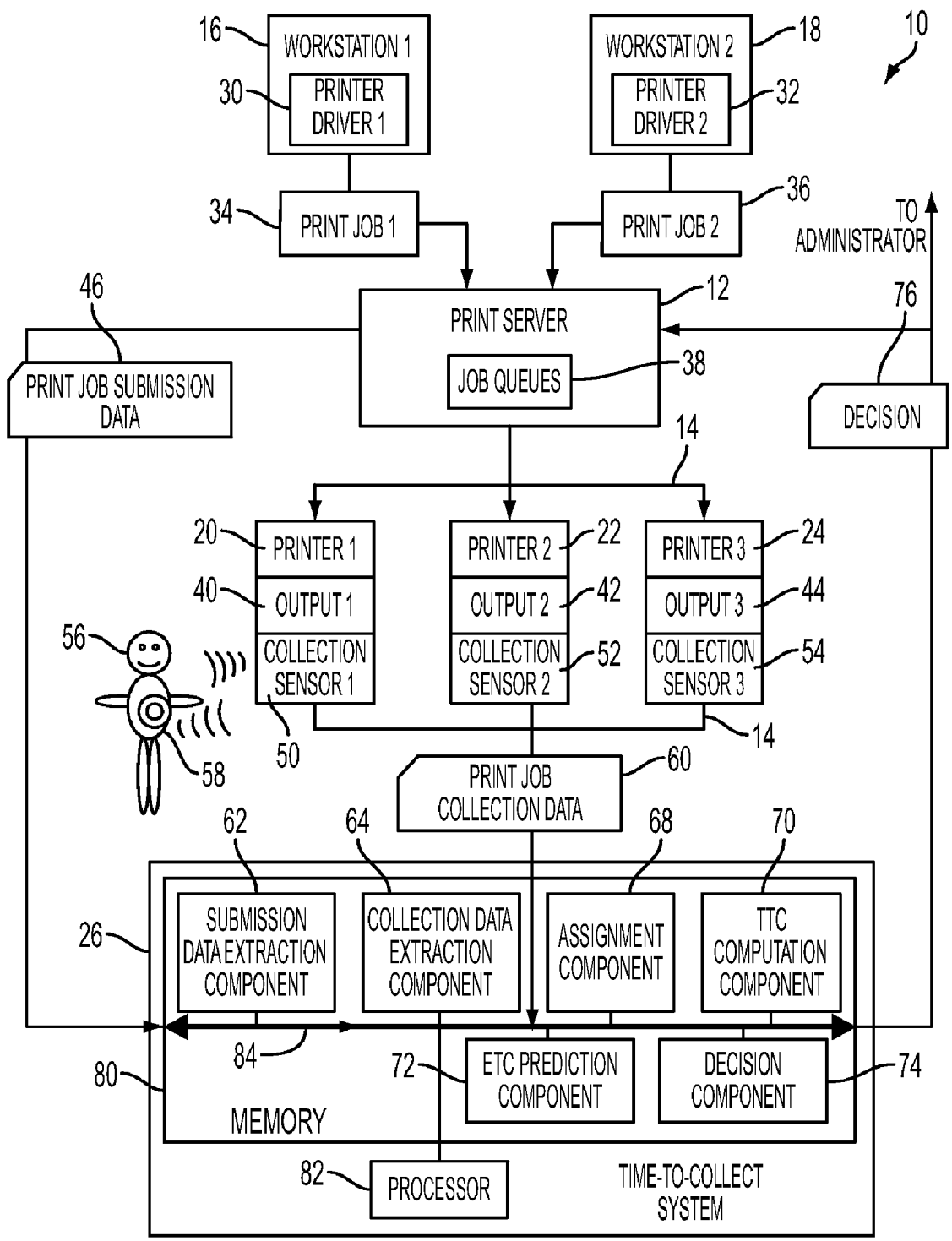
FIG. 1 is a functional block diagram of a networked printing system which incorporates a time-to-collect system in accordance with one aspect of the exemplary embodiment.

The "Expected Time-to-Collect" (ETC) as used herein, is a statistical measure of when a job, such as a print job, will be collected after a user has submitted a job request, such as a print request. This measure is derived from statistical observations of the Time-to-Collect prior jobs. For convenience, the jobs will be referred to herein as print jobs, bearing in mind that other jobs outsourced to a shared device are also contemplated.

The ETC can be based on print job features, such as document length, document type, time of the day, or user features, such as user habits, user role, and the like which have been identified as having an influence on the Time-to-Collect. The ETC may be computed for a single print request submitted by a particular user. Or, the ETC may be computed for multiple print requests, e.g., for a class of print jobs or for a particular printer. Alternatively, it may be computed for a particular device in a network of shared devices.

The "Time-to-Collect" (TTC) for a given print job, is the time between the submission time and collection time of a print job. The submission time can be considered as the time at which submission of a print request occurred, e.g., as recorded by submission time stamp. The submission time stamps are consistently acquired at the same location, such as the users' computers, a network print server, or at the outputting printer so that the data is comparable. For example, the submission time can be computed as the time at which the user submits a print job request on the user's computer. The collection time can be computed from sensed data at the printer, such as when a particular user, or any user approaches the printer, as described in greater detail below. The TTC can thus be computed as a difference between two detectable time stamps. The difference between TTC and ETC is that the TTC is the time between two events that actually happened, whereas the ETC is a quantity that predicts the TTC. In one exemplary embodiment, the ETC for a single print request can be computed as soon as a print job has been submitted based on existing information, such as the document length, the past user behavior, the type of printer, and other print job features.

The term "device" or "printer," as used herein, broadly encompasses various shared devices such as printers, copiers, bookmaking machines, or multifunction machines, xerographic or otherwise, unless otherwise defined, which performs a print job rendering function for any purpose.

A "network printing system," as used herein incorporates a plurality of shared devices, which are accessible to one or more workstations, such as personal computers.

The term "print medium" generally refers to a physical sheet of paper, plastic, or other suitable physical print media substrate for images.

A "print job" generally includes a "printing object," which consists of one or more document images in a suitable format that is recognized by the printer, together with a "job ticket," which provides information about the print job that will be used to control how the job is processed, including the number of copies to be made. Where reference is made herein to processing operations related to the print job, such as requesting, collecting, storing, receiving, sending, etc., of a print job, this generally includes processing operations involving one or more of the printing object, its job ticket, information derived from the printing object and/or information derived from the job ticket, unless otherwise indicated.

The Time-to-Collect may be based on either complete or incomplete collection data. Complete collection data may be considered to be data where there is a high probability that a time stamp can be associated with the collection of a particular document, for example, because the identity of the person collecting the document is recognized or because the identity of the document being collected is recognized. Incomplete collection data can be based on the detection of a collection, e.g., of a user approaching the printer, where the identity of the user is not known. The recognition of the user collecting a document can provide greater accuracy by providing complete data. However, collecting only incomplete data allows the anonymity of the users to be preserved. In the exemplary system a sensing infrastructure is provided for collecting the collection data used to compute the TTC measure. Additionally, the system includes a model that can be used to map data logs to the ETC.

As briefly noted above, there are two main categories of system that may be used to detect that a submitted print job is collected, each with drawbacks and advantages in terms of set up costs and accuracy:

1. Full user identification: this category relies on an identification infrastructure, and on the assumption that users carry active identifiers that are sensed by suitable sensors proximate the printer or that the collection of a particular document can be otherwise sensed. In this case, the time-to-collect is considered to be fully observed (i.e., by presuming that the instances where a user is detected but does not actually collect the document are relatively insignificant). The time to collect is computed as the difference between the two time stamps.

2. Fuzzy user identification: in this category, a sensor on the printer detects that a document is collected and generates a collection time stamp without revealing the identity of the user. In this case, a probabilistic method is used to recover the most probable print job request time stamp(s) associated with each collection time stamp. From this information, the time-to-collect can be computed as the difference between the two time stamps, as for the first method.

In either case, the method for prediction of the Expected Time-To-Collect can then be equivalent to a simple regression where the inputs are the job features and the output is the time-to-collect.

With reference to FIG. 1, an exemplary network printing system 10 includes a print server 12, which is communicatively linked by a network 14 to one or more workstations, here illustrated as first and second workstations 16 and 18, and to a plurality of shared printers, here illustrated as first, second, and third printers 20, 22, 24, although fewer or more networked workstations and/or shared printers may be provided. An information processing system, here referred to as a Time-to-Collect system 26, collects submission and collection time data and computes the TTC for print jobs therefrom. Time-to-Collect system 26 may be resident on the print server 12, or elsewhere in the network.

Each workstation 16, 18 is associated with a respective printer driver 30, 32 which generates print jobs 34, 36. In the normal course, print jobs 34, 36 are received by the print server 12, via the network 14. The print jobs arriving from the plurality of workstations 16, 18 are all placed in a global print queue 38. The print jobs 34, 36 are processed by the print server 12 in accordance with their job tickets and sent to one or more of the printers 20, 22, 24 for printing. The printers 20, 22, 24 place the print jobs 34, 36 in their respective print queues. The printers 20, 22, 24 render the print jobs 34, 36 on print media and output the printed media to one or more output devices, such as finishers, trays, or the like, here illustrated as outputs 40, 42, 44. As will be appreciated, the exemplary network printing system 10 is not limited to the configuration shown and may be otherwise configured with any number of workstations and printers.

Print job data 46 (e.g., from the print job's job ticket) is sent to the Time-to-Collect system 26 by the print server 12 or directly from the respective workstation's printer driver 30, 32. The print job data 46 includes data from which print job submission event data can be extracted, such as a submission time stamp and an identifier which uniquely identifies the user who submitted the print job. The identifier can be a name or an alphanumeric code, or the like.

Each of the printers 20, 22, 24 has an associated collection detector 50, 52, 54 which generates collection event data, such as collection time stamps (referred to herein as times or dates) representing the collection of a print job. The detector 50, 52, 54 may be a person sensor and/or a document sensor. In one embodiment, the person sensor 50, 52, 54 may be configured for detecting the presence of any person 56 who is proximate the printer's respective output device 40, 42, 44, without identifying the particular person, thus generating what is referred to above as incomplete data. Exemplary sensors of this type include heat sensors, motion sensors, light sensors, and the like. The person sensor, in this embodiment, is generally of relative short range such that it only detects the presence of persons close enough to be collecting a print job, rather than those persons merely passing by. In another embodiment, the person sensor 50, 52, 54 detects that a specific user is proximate the printer, for example, by detection of a unique identifier 58 carried by the person or manually input, such as a key, radio transmitter, or the like. This allows the generation of what is referred to above as complete data, in which the identity of the user is used to tie a detected collection time to the corresponding detected print job submission time. In this embodiment, the collection event data includes both the collection time and a unique identifier for the person collecting the document.

In the case of a document sensor 50, 52, 54, the sensor detects actions at the printer, such as the removal of a document from the output device. For example, a motion sensor detects motion of the output tray or a light sensor detects motion of a document on the tray, which generally results in incomplete data. In some embodiments, the document sensor is able to distinguish between documents (e.g., from the document banner) and thus provide complete data. Collection event data 60 from the sensor 50, 52, 54, such as time stamps, is sent to the Time-to-Collect system 26.

With continued reference to FIG. 1, the exemplary Time-to-Collect system 26 includes a job submission data extraction component 62 which extracts, from the print job submission data 46, such as a submission time for each submission event (corresponding to a job submission), a user identifier corresponding to the person submitting the job, as well as features of the print job, such as document type, document size, etc. The submission event data may be gathered for a predefined time window, such as two hours or a day. A collection data component 64 stores the collection event data 60, specifically, the collection time of each collection event (and, in the case of complete data, a user identifier) for a set of collection events within the predefined time window. An assignment component 68 links collection events to probable corresponding submission events, in the case of incomplete data. A time-to-collect computation component 70 determines a time-to-collect from the respective linked submission and collection times and may determine an average time-to-collect by combining a plurality of the computed time-to-collect values. The exemplary Time-to-Collect system 26 further includes a prediction component 72, such as a regression model, for predicting the Expected Time-to-Collect for a new print job (or jobs), based on previously acquired Time-to-Collect data and features of a newly-submitted print job. Optionally a decision component 74 makes a decision 76, e.g., for the print job or for the network in general, based on the ETC output by the prediction component 72. For example, if the prediction component 72 generates a lengthy ETC, suggesting that the user is unlikely to collect the print job for a relatively long time, the decision component 74 may permit the print job to be rescheduled to allow one or more print jobs with shorter ETCs to be printed first.

As will be appreciated, while the exemplary TTC system 26 is shown as including processing components 64, 68, and 70, these components need not be a part of the functioning time to collect system 26 once the prior data has been acquired and input to the prediction component 72. Alternatively, these components may be retained for updating the prediction component 72 with new data periodically. In other embodiments, components 64, 68, and 70 are separate from the TTC system 26 and the TTC system 26 serves primarily as a prediction system.

Figure 2:
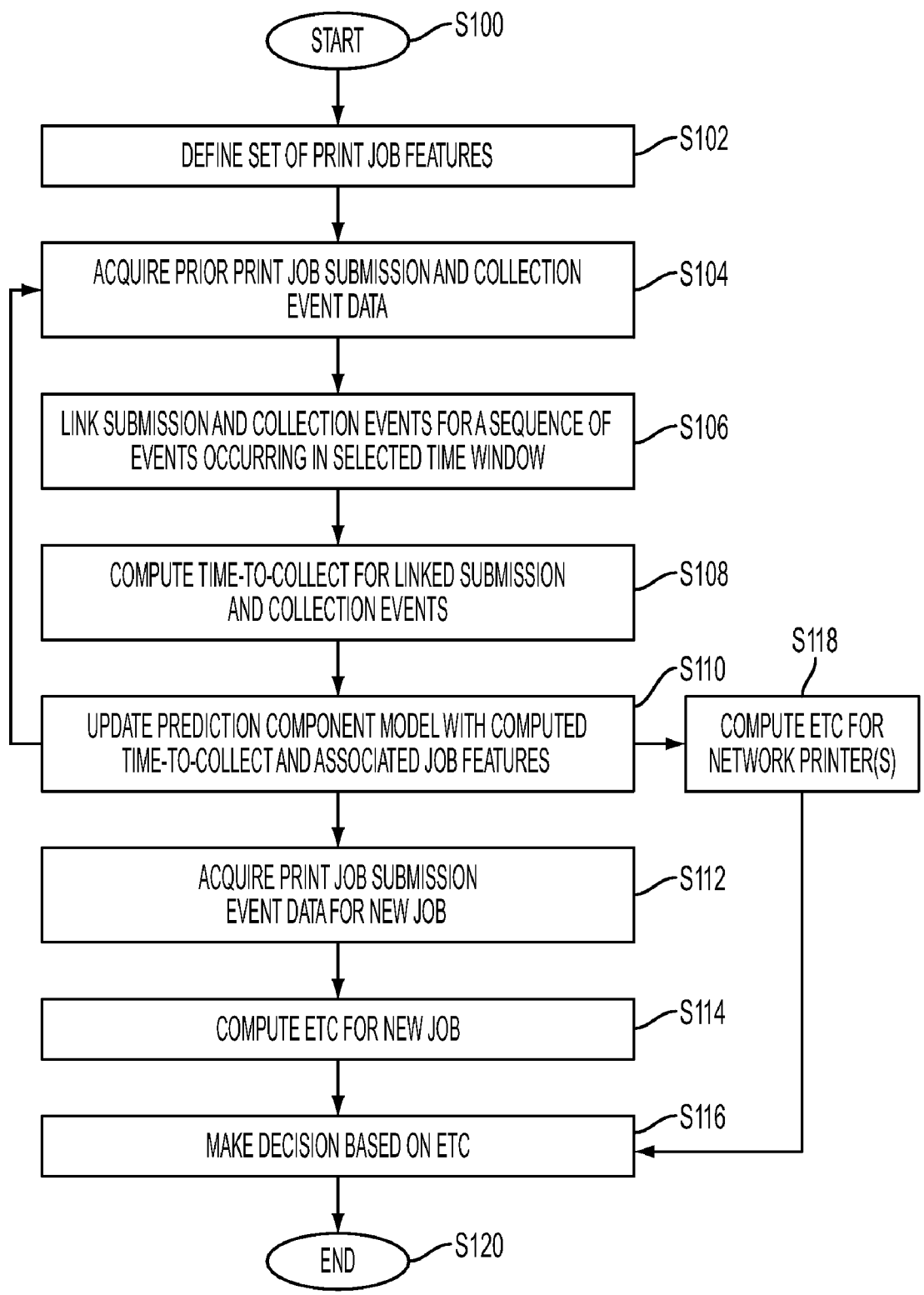
FIG. 2 is a flow chart which illustrates methods for recovering a sequence of print events associated with a set of print jobs, computing an expected time to collect for each of the print jobs, based on the sequence, and for using the time-to-collect for generating a probabilistic model which can be then used for predicting the expected time-to-collect for print jobs, in accordance with various aspects of the exemplary embodiment.

The exemplary TTC system 26 executes instructions for performing the computer implemented steps of the method outlined in FIG. 2. The system may be hosted by any suitable computing device, such as a workstation, server, or the like. The components of the system 26 may be embodied in hardware, software, or a combination thereof. In the exemplary embodiment, the components are illustrated as being software components comprising instructions stored in memory 80. A processor 82, which executes the instructions, communicates with memory 80 via a bus 84. The memory 80 may represent any type of computer readable medium such as random access memory (RAM), read only memory (ROM), magnetic disk or tape, optical disk, flash memory, or holographic memory. In one embodiment, the memory 80 comprises a combination of random access memory and read only memory. In some embodiments, the processor 82 and memory 80 may be combined in a single chip.

FIG. 2 illustrates an exemplary information processing method which computes TTCs and allows an ETC to be provided for a pending print job. The method begins at S100.

At S102, a set of print job features is defined. The features are generally those which are likely to have an impact on ETC, such as one or more of submitter identity, time of day, printer selected for printing, number of requests submitted at one time, document type, printer proximity, submitter role, and combinations thereof. Each of these features may have a set of predefined feature attributes, which can be determined from the job ticket. In the case of submitter identity, the set of attributes comprises all the unique IDs of the users of the network. Additionally, or alternatively, for submitter role, there may be two or more attributes, such as manager, subordinate, etc. For number of requests, the attributes may be "single document" and "batch." For document type, the attributes may be "office document" and "URL", or more specific document types. For time of day, there may be two or more attributes, such as two or three periods during the work day. For printer proximity, there may be two or more attributes, such as "near," "intermediate," and "far."

Apart from this step (S102), all of the other steps of the method may be performed semi-automatically or automatically, by the exemplary system of FIG. 1.

At S104, prior event data is acquired. The event data generally includes print job submission event data and collection event data. The print job submission event data may include submission times and associated user identification and print job features for print jobs submitted for printing on one or more printers during a first time window. The print job collection event data may include simply a set of collection times occurring in a second time window which at least partially overlaps the first time window, and may be the same time window. Several sets of data may be obtained for a plurality of time windows.

At S106, for the prior data, submission events are linked to collection events by the assignment component 68. In the case of incomplete data, the linking includes processing a set of collection events and submission events occurring in an overlapping time window with an optimal assignment algorithm configured for outputting an optimal assignment of linked pairs of events, whereby one or more submission events can be linked to a probable collection event. Thereafter, the time-to-collect for each pair of linked submission and collection events can be computed as the difference in their times (S108).

At S110, the prediction component 72 is input with the computed time to collect data and associated features for a set of jobs to generate a regression model, e.g., by averaging the TTC's of jobs with the same or similar features, which is stored in memory. The prediction component can then be used to compute an ETC for various applications using the model.

As will be appreciated once steps S102-S110 have been completed and the prediction component 72 generated, these steps need not be repeated. Alternatively, steps S104-S110 can be repeated at intervals to update the model for the prediction component 72.

The thus-developed prediction component can be used for various purposes. For example in one application, at S112, for a pending print job, a print job submission time and any associated print job features corresponding to features in the set of job features are identified. The pending print job has not been printed at this stage, thus no collection event data is available.

At S114, the job print submission time and identified associated print job features are used to compute an ETC. In the exemplary embodiment, the submission event data are input to the prediction component 72, which outputs an ETC based on the input submission event data for the pending job and the prior TTC data stored in the model.

At S116, a decision may be made based on the ETC, such as whether to delay the print job or redirect the print job to a printer different from the one scheduled for printing the print job.

In another application, at S118, the prediction component 72 is used to compute an ETC for a particular printer in the network or for each of several printers, or for a group of printers as a whole. As for the single job ETC, the ETC can be used to make a decision for the printer or for multiple printers in the network. The method ends at S120.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 5, can be used to implement the method for computing TTCs and ETCs.

Aspects of the exemplary system and method will now be described in further detail.

A. FEATURES INFLUENCING THE TIME-TO-COLLECT (S102)

In order to allow the prediction component to take into account features of the print job in computing an ETC, print job candidate features may be investigated to assess which have the most impact on TTC.

For example, a collection of user data is acquired which allows relationships between candidate features and TTC to be determined for a given user or users. For example, the user data shown in Table 1 may be acquired:

TABLE 1

| Exemplary candidate features | Description | Exemplary feature attributes | Exemplary Logged Data |
|---|---|---|---|
| User ID | Unique ID of user (e.g., name, password, etc) | | J. Doe |
| Time stamp of print request | Date and Time print job request was recorded | | 2/3/09 10:32 |
| Time stamp of print performed | Date and Time print job request was recorded | | 2/3/09 10:40 |
| Time of collection | Collection time stamp | | 2/3/09 11:02 |
| Printer | Unique identifier of printer | | Printer 2 |
| Number of requests | | Alone Batch | Batch |
| Document type | | Text (e.g., Word document) Graphics (e.g., PDF) Electronic mail URL (website content) Powerpoint | Powerpoint |
| Printer location | Proximity to user | Close Far away | |
| User Role | Position in organization | Manager Employee Research Assistant | Research |
| Activity | What the user is doing | Normal About to go home On way to meeting | |

The first five rows indicate respectively: the identifier of the user issuing the print request, the time stamp of the issued print request, the time of the print operation, the time of collection and the identifier of the printer. The last five row variables contain additional features that may influence the time-to-collect. As will be appreciated, the last feature, "activity" may be difficult to collect data on for identifying feature attributes, so may not be particularly useful in situations where actions of users are not recorded. Some of the features are user dependent (e.g., role), while other features are job dependent (such as batch vs. single).

Figure 3:
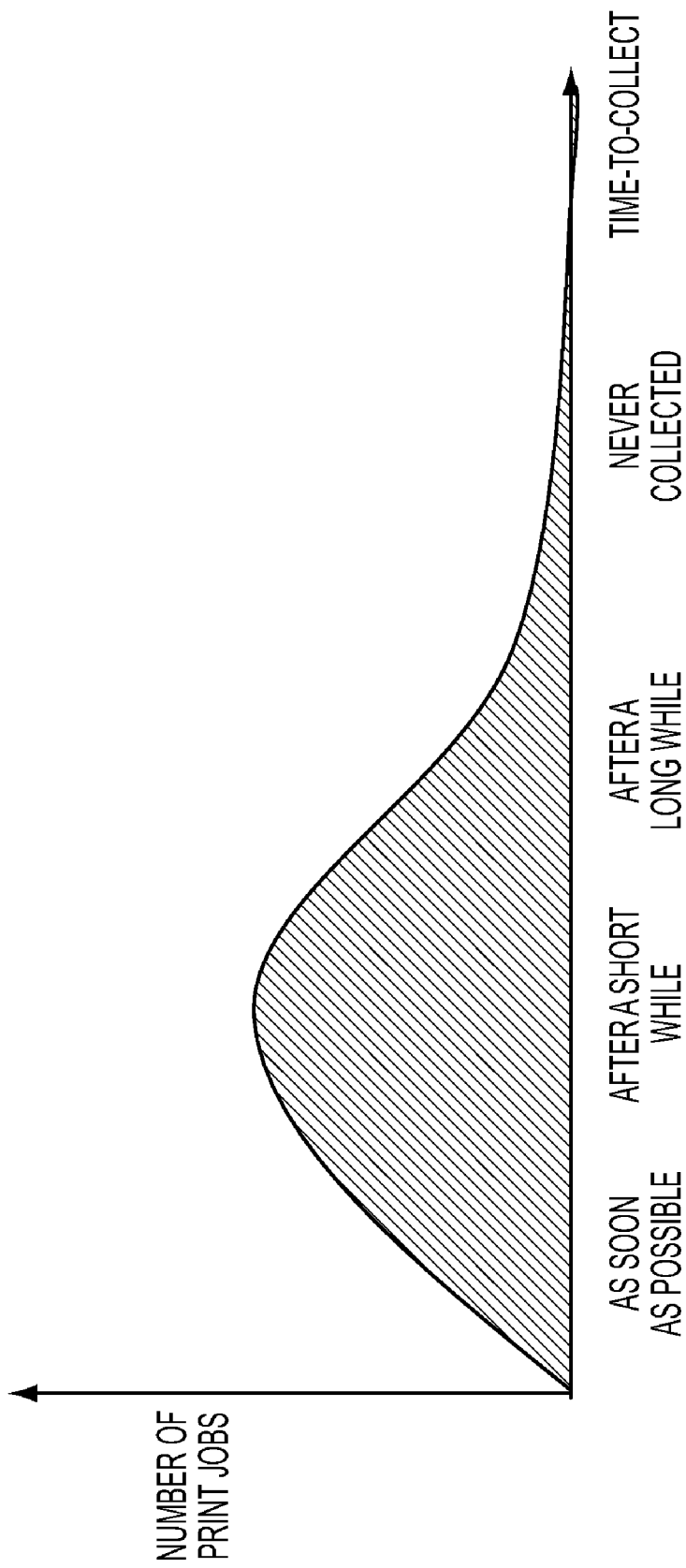
FIG. 3 illustrates a typical time-to-collect distribution for print jobs.

In the exemplary embodiment (at S110), the time-to-collect data are used to learn one or more statistical models for predicting the user expected time of collection, which together form the prediction component. The statistical model may be based on a classical regression in which inputs are the features previously identified and the output is the time-to-collect. The statistical model models user habits and describes the relationships between different logged features and user behavior. It can be expected that a user may present different causal relationships that influence the behavior for collecting the print jobs and having therefore different influencing features. The exemplary method therefore includes a user observation phase (S102) where the correlations between the variables, if any, are captured. For ease of computation, the time span over which most documents are collected (e.g., 1-2 days) can be roughly divided into time intervals, e.g., corresponding to as soon as possible (such as within 5 minutes of the job being printed) a short while (such as from 5-30 minutes of the job being printed), a long while (such as from 30 minutes to 12 hrs of the job being printed) or never collected (e.g., a collection time of over 12 hrs). FIG. 3 illustrates a typical Time-to-Collect distribution for one user.

An example of a stereotypical use is that a user tends to collect external documents (e.g. from the Web) "after a long while", whereas for all the other documents there is no typical pattern. Another example is the one of a user who tends to collect the print jobs after a short while when documents are sent in a batch, while she almost always collects them immediately when the document is a mail and half of the times she never collects documents that are external (e.g. from the Web). Thus, in one embodiment the prediction component 72 may comprise statistical models for each of a set of users of the network. Alternatively, users of a particular class, such as manager, employee, etc. may be found to exhibit similar behavior, so this may be incorporated simply as a feature.

The exemplary system and method find application in situations involving decision-making processes based on printer user behaviors. Examples include productivity assessment processes and decision-making processes for dynamic print job scheduling. In particular, the ETC measure finds application in services aimed at delivering measurable efficiencies by leveraging a set of office technologies, business processes, methodologies and software tools to reduce costs and improve productivity of office workers and their business processes. The system may be utilized with a Print Infrastructure Mining (PIM) tool that aims to extend the capabilities of a software suite for managing infrastructure assets, such as printers, in the office. The measure may be a useful tool along with the automatic analysis and visualization of information extracted from the log data of customers' print infrastructures. In this context, the proposed ETC measure can be an additional parameter in support of an automatic analysis of the infrastructure usage.

B. THE ASSIGNMENT METHOD

As previously noted, in the case of incomplete data, the assignment component 68 may process the acquired submission and collection data with an algorithm that recovers the most probable print event sequence of linked submission and collection events, given the incomplete observations coming from sensors that detect that someone comes close to the printer (S106). The recovered print sequence can then be used to compute the TTC for prior print jobs and the expected Time-to-Collect and its standard deviation. The method assumes that over a period of time, several users may send print requests to a given printer and at some time thereafter, a collection time is recorded, e.g., by sensing someone coming close to the printer. Over a period of time, such as an hour or a day, several collection times are recorded, but it is not known which collection time corresponds to a corresponding submission time for a particular print job. It is assumed, of course, that a collection time cannot precede a submission time for that print job.

After a user has submitted a job to a printer at a given time t (the submission time) there are several possibilities for the document collection:

1. The user collects the printed document at time t'>t,
2. The user prints another job before collecting his document (i.e., two documents may be collected at the same time),
3. The user never retrieves his document.

There are several approaches which may be used, which vary in their capabilities for determining the ground truth (i.e., the actual links between job submission times and collection times). These approaches are described below as the Baseline Method, the Optimal Assignment Method, and an extension of the Optimal Assignment Method, referred to as the Probabilistic Optimal Assignment Method.

To evaluate the effectiveness of each of these methods, a set of data was collected in which the ground truth was known, i.e., at what time each job was collected and thus what submission time or times (where multiple jobs are submitted before a collection) is linked to that collection time. An extract of the data set is shown in TABLE 2, below. In generating the set of data, print job submission times and document collection times were recorded between 17:07 and 17:20 on a particular date. These data are indexed as events from 1-18 and given in columns: 'date', 'user id' and 'event' in TABLE 2. The user ID is given only for the job submissions, with a question mark given for the collection times. An event labeled 'submit job' means that the user has submitted a job at the specified time. An event labeled 'collect document' means that someone collected a document. In the column labeled 'ground truth', the information (which is usually not available) that the method is attempting to recover is given. In the table, the ground truth is given as the index of the next event in relation to the event row. Collection events all have a ground truth of 0, since no subsequent event is linked to a collection. As an example, the event 1 (first row) has the index 3 in its 'ground truth' column. This means that the user A has collected his document at time '17:08:23'. For index 7, it can be seen that user E prints another job at time '17:11:53' and then another one at time '17:13:13' and finally collected his 3 prints at time '17:16:49'.

In the column labeled Baseline Method, the index for each submission event is given as the closest event in time, and can thus be the index of a subsequent collection event or another subsequent submission event.

The last column shows the index which is output by the Optimal Assignment Method using the proposed algorithm. As can be seen, the Optimal Assignment Method is much better than the baseline method at achieving the ground truth when multiple users print in a short period of time or when a single user sends multiple jobs before collecting the document.

TABLE 2

Example Dataset Used For Evaluation

| Index | Date | user id | Event | ground truth | Baseline method | Optimal assignment method |
|---|---|---|---|---|---|---|
| 1 | 17:07:51 | A | submit job | 3 | 3 | 3 |
| 2 | 17:08:21 | B | submit job | 4 | 3 | 4 |
| 3 | 17:08:23 | ? | collect document | 0 | 0 | 0 |
| 4 | 17:09:04 | ? | collect document | 0 | 0 | 0 |
| 5 | 17:09:08 | C | submit job | 11 | 11 | 11 |
| 6 | 17:10:06 | D | submit job | 15 | 11 | 12 |
| 7 | 17:11:14 | E | submit job | 9 | 11 | 9 |
| 8 | 17:11:28 | F | submit job | 12 | 11 | 13 |
| 9 | 17:11:53 | E | submit job | 14 | 11 | 14 |
| 10 | 17:12:05 | G | submit job | 13 | 11 | 15 |
| 11 | 17:12:14 | ? | collect document | 0 | 0 | 0 |
| 12 | 17:12:21 | ? | collect document | 0 | 0 | 0 |
| 13 | 17:13:09 | ? | collect document | 0 | 0 | 0 |
| 14 | 17:13:13 | E | submit job | 16 | 15 | 16 |
| 15 | 17:16:26 | ? | collect document | 0 | 0 | 0 |
| 16 | 17:16:49 | ? | collect document | 0 | 0 | 0 |
| 17 | 17:18:16 | 10 | submit job | 18 | 18 | 18 |
| 18 | 17:20:10 | ? | collect document | 0 | 0 | 0 |

The goal of a suitable statistical model is to recover the 'ground truth' column based only on the columns'' 'date', 'user id', and 'event'. It is to be appreciated however, that complete realization of the ground truth is generally not feasible and that even the best models will exhibit some errors. As can be expected, the TTC, generated by the different methods differs slightly.

1. Baseline Model

In this relatively naïve approach, the data is handled with an algorithm which applies a minimal time method that associates a job submitted at time t to the closest collection time t' such that t'>t. While this may be a reasonable assumption if the interval between submissions is much greater than the time-to-collect, it is less accurate when multiple jobs are requested close together. Since multiple jobs can be assigned to the same collection time, the baseline method is not able to properly recover the correct print processes.

2. Optimal Assignment Model

This model is an extension to the baseline model, with the limitation that multiple jobs may not be assigned to the same collection time, other than as a linked chain of events. The sensor that detects the collection times is intended to count the number of persons N that come close to the printer, and in this case, a collection time is simply replicated N time indices. The method employed in this case also assumes that a collection time corresponds to a single user, i.e., a user does not collect jobs that have been submitted by other users. Based on observations, this is a reasonable assumption for generating a simplified model.

This leads naturally to an optimal assignment problem between submission times and collection times. The algorithm for the optimal assignment method may be represented as follows:

Inputs are pairs $(s_i, t_i)$ for $1, \ldots, n$. The time of the $i^{th}$ event is given by $t_i$. An event can be a submission event or a collection event. If the $i^{th}$ data is a submission time, then $s_i$ equals the user index $u_j$. If the $i^{th}$ data is a collection time, then $s_i$ equals 0 (since this information is not known). The objective is then to solve the following integer programming problem over all pairs of events i and j:

$$\min_{E \in \{0,1\}^{n \times 2n}} \sum_{i=1}^{n} \sum_{j=1}^{n} w_{ij} E_{ij} \quad (1)$$

$$\sum_{i=1}^{n} E_{ij} = 1 \quad \forall j = 1, \ldots, n \quad (2)$$

such that $$\sum_{j=1}^{n} E_{ij} = 1 \quad \forall i = 1, \ldots, n$$

where n represents the number of events in the considered time period and $w_{ij}$ represents a weight:

$$w_{ij} = \begin{cases} (t_j - t_i)^2 I_{\{t_j > t_i\}} & \text{if } u_j = 0 \text{ or } u_i = u_j \\ \infty & \text{otherwise} \end{cases}, \quad (3)$$

and where E represents the assignment matrix: $E_{ij}=1$ means that the event i is linked to event j if $j \leq n$ or is not linked to any posterior event if $j > n$.

$t_i$ represents the time of a first event i
$t_j$ represents the time of a second event j
I is the indicator function (if $t_j > t_i$, then I=1, otherwise 0)
$u_i$ represents the user index for event i and
$u_j$ represents the user index for event j This weighting system has the effect that the algorithm only considers cases where event j is later in time than event i and where either $u_i$ is the same as $u_j$ (the two events are by the same person) or $u_j=0$, i.e., event is a collection event and thus the person collecting the job is unknown. In such cases, the weight accorded is a function of the difference between the two times. As can be seen, the weighting of these cases favors the linking of events which are close in time. If neither of these cases is true (i.e., the events i and j are by different people or event j precedes event i), then the weight is set to a high level ($\infty$) and thus the associated assignment matrix for these two events is unlikely to form a part of the optimal assignment.

In the exemplary embodiment, the weighting $w_{ij}$ is the square of the difference in time between event i and event j, although it is also contemplated that other functions of the time difference may be considered, such as a simple difference or a log function of the difference.

The two constraints in Eqn. (3) have the result that an event cannot be preceded by more than one other event (submission or collection time) in the past and cannot be followed by one other event in the future, i.e., branching is not permitted. Thus, in order to join two submission times to a single collection event, the first submission event is linked to the later submission event and that submission event is then linked to the collection event. Further, it requires that a submission event cannot be linked to another submission event by a different person.

The exemplary algorithm aims to minimize the sum in Equation (1). The set of links $E_{ij}$ between events which satisfy this optimal assignment are output as the assignment matrix E. The result of this assignment problem applied on the example data, is given in the last column of Table 2. As can be seen, this algorithm works significantly better than baseline method.

Once the links have been identified, the time to collect for each print job submitted can be readily computed. For example, for the first job, which was submitted at time 17:07:51, the optimal assignment model links event 1 to event 3 (see Table 2). Since this is a collection event, the time to collect for the job submitted in event 1 is simply the time difference, i.e., 17:08:23−17:07:51=32 seconds. Where two submission events are linked, the chain is followed until there is an eventual collection event. Thus, for example, the model links event 7 to event 9, which is in turn linked to event 14, which is linked to event 16, a collection. The time to collect for the job submitted at event 7 is thus computed as 17.16.49−17:11:14=5:35.

As will be appreciated, for any selected time window for evaluation, one or more jobs may not be collected. These jobs may be readily detected by having no linked collection event and may be ignored for purposes of computing ETCs.

3. Probabilistic Optimal Assignment Model

In the optimal assignment method described above, the weights are simply a function of the time difference between two linked events. In another embodiment, other factors are used in addition to the time differences to determine the weights. In the Probabilistic Optimal Assignment Method described in greater detail below, the weights are a function of the type of events which are linked as well as the time difference between them. The exemplary weights used apply probabilistic distributions, such as exponential, Weibull, and log normal distributions. For example, the links between events can be classified into the following types, each with a different weighting scheme:

1. A link between two submission events,
2. A link between a submission and a collection event,
3. A link between a submission event and a presumed collection event (which has not been observed in the time window),
4. Noise-related events, e.g., a collection event for which there is no submission event, such as a copy job.

One assumption in both these approaches (optimal assignment method and probabilistic optimal assignment method) is that only one collection time corresponds to only one user job submission. However, it is to be appreciated that some users may collect the documents of others and bring them directly to their office. To model this mutual aid between colleagues, it is possible to assume that some collection times are not observed. In this case, a proportion parameter p may be added representing the probability of 'non-observation'. For each submission at time t, there is a probability p that the collection time is not observed.

C. PROBABILISTIC MODELLING

To explain user behavior, one way is to define a probabilistic model to explain the printing process. The optimal assignment problem arises naturally as a statistical estimation procedure. In the discussion below, a brief description of the observations that can be made concerning the user-printer interactions is given. Then, a probabilistic model is described for s-s-s-c-c-c sequences where 's' stands for 'submission time' and 'c' stands for 'collection time' and its extension to multiple sequences of this type. A description of one embodiment of the algorithm for the probabilistic Optimal Assignment Method and the choice of the parameters for the algorithm are then described.

Figure 4:
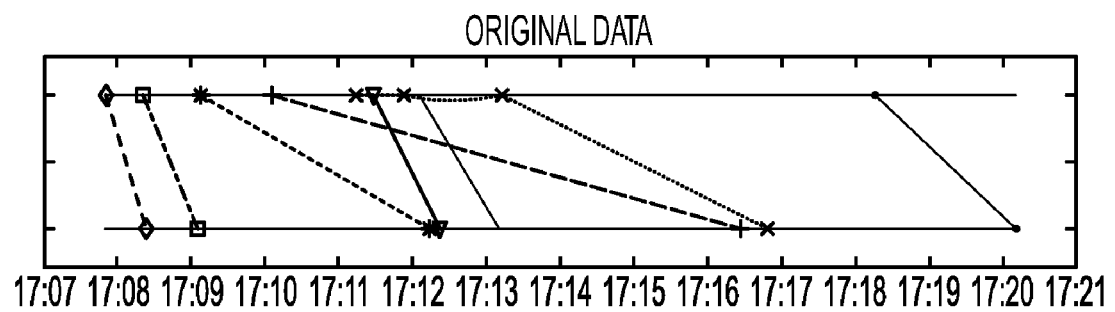
FIG. 4 illustrates a sequence of print events which the time-to-collect system aims to recover.

FIGS. 4-7 show graphs illustrating the jobs illustrated in TABLE 2. In each graph, the upper horizontal line corresponds to the time line of the times of submissions. The lower horizontal line represents the time line of stack manipulation events (sensed data) on the printing device. FIG. 4 shows the original data for when users decided to print and when they collected their documents. The links represent the information which the method aims to identify.

Figure 5:
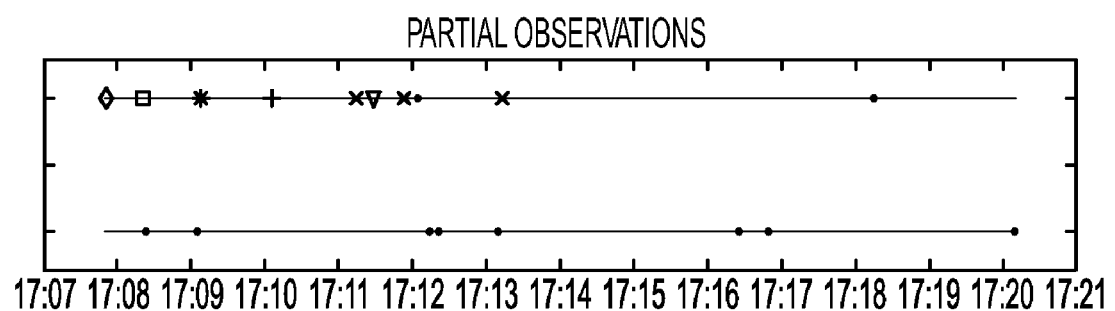
FIG. 5 illustrates the print events of FIG. 4, without links between events.
Figure 6:
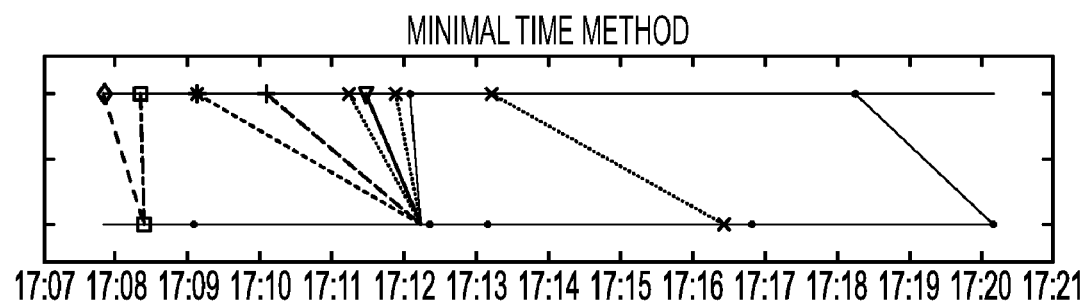
FIG. 6 illustrates a sequence of print events as recovered by a baseline method.
Figure 7:
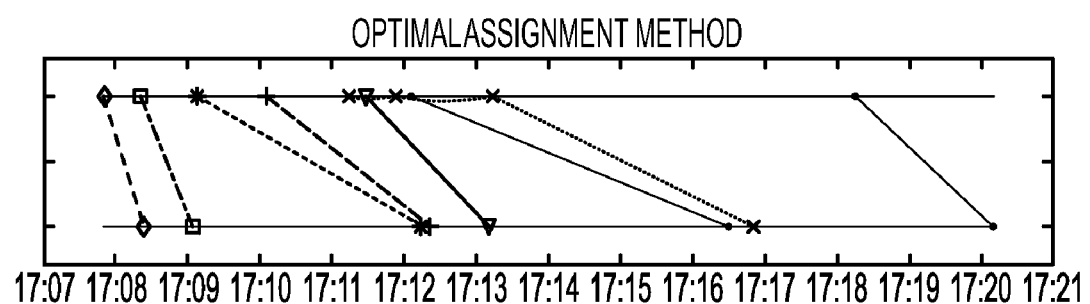
FIG. 7 illustrates a sequence of print events as recovered by a optimal assignment method.

FIG. 5 shows the partial observations which the system collects, i.e., the links between job submission and collection times are lost. This is the information which is input to the model. The model aims to find the most probable links between the job submission and collection times. FIGS. 6 and 7 show the results of the basic method and optimal assignment method in recovering the correspondences between submission times and collection times.

1. Behavior of Users

Based on the observation of some users printing documents in an office environment, the following behaviors can be identified as being common:

1. A user often prints on the same printer.
2. Some users print several documents on a printer before collecting them.
3. The number of interactions between users is negligible (independency of the user behaviors is a reasonable assumption),
4. Some users wait several seconds in front of the printer while the document is processed. They may grab some pages before the document is fully printed,
5. The printers are subject to failures. Sometimes, they can be fixed by users (e.g. paper jam).

These observations illustrate that the process of printing a single document is not always simple due to the high level of noise. To analyze the user-printer interactions in normal conditions, the exemplary method does not take into account the printer failures. A statistical model is described below which takes into account most of the remaining above-mentioned events.

2. Print Process Modelling

First, a definition of the semi-Markov processes that are used in the exemplary model are described. A "semi-Markov process," also known as a Markov renewal process, extends the traditional Markov chains by assuming that the time between state transitions is random. A semi-Markov process can be constructed from a pair of processes (S,D), where:

$S=(S_1, S_2, \ldots, S_n, \ldots)$ is a Markov chain with state space $\{1, \ldots K\}$ and $D=(D_1, D_2, \ldots, D_n, \ldots)$ is an infinite series of positive durations. The distribution $D_i$ depends only on $S_{i-1}$ and $S_i$.

In this embodiment, only semi-Markov chains defined on the finite state spaces are considered.

Since the properties of D (such as mean transition time) may depend on which site S chooses next, semi-Markov processes are in general not Markov process. Yet, the joint State-Duration process (S,D) is a Markov process.

2.1 Model for a Single Print Flow

In modeling a user printing on a single device, it can be assumed that the job submission times are fully observed (electronic logs are usually stored by the print server) and the job collection times (a sensor detects that someone takes a job on the output tray). In modeling a print flow, the model should allow users to send several jobs to the printer before collecting the document. Once the user collects the document, it is also modeled that the sensor detects the user multiple times.

This can be easily modeled by a 2-states semi-Markov chain, where the states correspond to submitting jobs and collecting documents. Let $T_n$ denote the time of an event, which is the sum of the previous duration:

$$T_n = \sum_{k=1}^{n} D_k$$

$S_n=1$ means that at time $T_n$ the user submits a job,
$S_n=2$ means that at time $T_n$ the user collects a document.

The initial state $S_1$ can be 1 with probability $\rho$, for normal print jobs, or it can be 2 with probability $1-\rho$, for other jobs without identification, such as scanning or photocopying. It is also assumed that the initial time is uniformly distributed over the time period considered.

To model the dynamics, the transition matrix $A_{ij}=p(S_{n+1}=j|S_n=i)$, $(i,j)\in\{1,2\}^2$ is defined as follows:

$$A = \begin{bmatrix} (1-\varepsilon) & \varepsilon \\ 0 & 1 \end{bmatrix} \quad (4)$$

This model implies that a user first prints m jobs where m is a geometrical distribution with parameter $\varepsilon$, and then collects his document one or more times. The zero probability in $A_{21}$ shows that the model does not allow the user to submit a job after a collection time. If the user submits a job after having collected a document, it is considered that multiple print flows are involved (see below).

The transition durations $F_{ij}=P(T_{n+1}-T_n \leq t|S_n=i,S_{n+1}=j)$, $(i,j)\in\{1,2\}^2$ are defined as follows:

$$F_{11}=\epsilon(\lambda) \quad (5)$$

$$F_{12}=LN(\alpha_1,\beta_1) \quad (6)$$

$$F_{22}=W(\alpha_2,\beta_2) \quad (7)$$

where $\epsilon$ denotes the exponential distribution, LN the log-normal distribution and W the Weibull distribution.

$\lambda$ is the parameter of the exponential distribution.
$\alpha_1$ and $\beta_1$ are the parameters of the log-normal distribution.
$\alpha_2$ and $\beta_2$ are the parameters of the Weibull distribution.

See, for example, E. Limpert, W. Stahel, and M. Abbt, Log-normal distributions across the sciences: Keys and clues. *BioScience*, 51 (5): 341-352 (2001); and W. Weibull, A statistical distribution function of wide applicability. *J. Appl. Mech.-Trans. ASME*, 18(3): 293-297 (1951), for further details on these distributions.

It may be noted that the distribution $F_{21}$ is not defined since it is not possible to go from state 2 (collection of a document) to state 1 (submission of a job). The full set of model parameters is $\theta=(\epsilon,\lambda,\alpha_1,\beta_1,\alpha_2,\beta_2)$. Further details on how these parameters are estimated are provided below.

Figure 8:
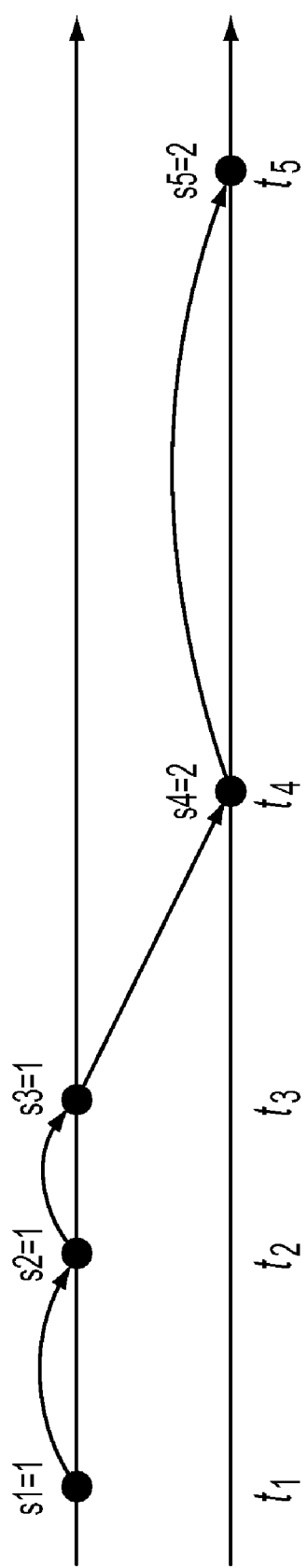
FIG. 8 illustrates a semi-Markov process in which links between events in a user print process are shown.

By way of an example, FIG. 8 shows a print process where the user submitted three jobs at times $t_1$, $t_2$ and $t_3$, and the sensor on the printer detected two collections of a document at times $t_4$ and $t_5$. Here, $t_2-t_1$ and $t_3-t_2$ are random variables with distribution $F_{11}$. $t_3-t_2 \sim F_{12}$, and $t_5-t_4 \sim F_{22}$.

2.2.1 The Choice of Log-Normal Distribution

The choice of the log-normal distribution for $F_{12}$ allows a distribution that is more flexible that an exponential distribution and that satisfies some consistency properties. To see why the exponential distribution is not as satisfactory, a simple case is considered where two users A and B are strictly identical (the model parameters are the same for each user). Assume user A submits a print job at time a and user B submit a print job at time b>a. Then two collection times u and v are observed such that v>u>b, but it is not known to which user the times are associated. Four events are possible:

1. User A collects his document at time u and B collects at time v.
2. User A collects his document at time v and B collects at time u.
3. User A collects his document at times u and v and B never retrieves his document.
4. User B collects his document at times u and v and A never retrieves his document.

In this simple case, it would be desirable to satisfy the following property when u−b is sufficiently large:

$$P(\text{event1}) > P(\text{event2}). \quad (8)$$

This means that the most probable event should correspond to users that collect their document in the same order as they have submitted their (last) job. This constraint is not satisfied if the exponential distribution is used to model the transition times between submissions and document collections, i.e., $F_{12}$. Eqn. (8) is, however, satisfied by the log-normal distribution for large values of u−b.

More generally, the property in Eqn. (8) is satisfied for every value of u−b if the cumulative distribution function of $F_{12}$ is of the form $F(t)=1-e^{h(t)}$ where h is a strictly convex function. This is equivalent to assuming that the distribution has a decreasing hasard function:

$$\frac{F'(t)}{1-F(t)}.$$

Weibull distributions with parameter β<1 satisfy this constraint. However, it is advantageous to use a lognormal distribution which gives small probabilities to small times: F'(0)=0 rather than Weibull distribution with β<1 for which F'(0)=∞. On the other hand, for the choice of $F_{22}$, the Weibull distribution with parameter β<1 is better because it allows multiple document collection detections in a very short time, i.e., F(0)=∞.

2.2.2 Joint Probability of a Print Process

The probability of the print flow $(s,t)=((s_1,t_1), \ldots, (s_N,t_N))$ in the interval $[t_{min},t_{max}]$ is:

$$p(s, t, N(t_{max}) = n) =$$

$$\pi(t_1, s_1) \left( \prod_{i=2}^{N} p(s_n|s_{n-1})p(t_n|s_n, s_{n-1}) \right) P(t_{n+1} \geq t_{max}|t_n, s_n)$$

where N(t) denotes the number of events from $t_{min}$ to t and $$\pi(t_1,s_1) = (\rho I_{\{1=1\}} + (1-\rho) I_{\{s_1=2\}}) I_{\{t_1 \in [t\,min, t\,max]\}}$$

corresponds to the distribution of the first event. This probability is useful for recovering the most probable individual print flows if multiple print flows are observed at the same time. This problem is addressed in the next section.

3. Multiple Prints

A given printer may be used by multiple users which generate print flows randomly. Note that for a given user, several semi-Markov chains may be generated, each of them corresponding to a single workflow. Assume that K independent workflows $(s^{(1)},t^{(1)}), \ldots, (s^{(K)},t^{(K)})$ are generated during $[t_{min},t_{max}]$.

However, when observing the data, it is not known which observation relates to which print flow. The goal is to recover the most probable assignment of observations to workflows. Denoting with $\sigma_{ki}$ the index of the observation that corresponds to the i-th event of the k-th print flow with $n_k$ the number of events of the k-th print flow, the probability of observation given this assignment is:

$$p(s, t | \sigma) = \prod_{k=1}^{K} \pi(s_{\sigma_{k1}}, t_{\sigma_{k1}}) \quad (9)$$

$$\prod_{i=2}^{n_k} p(s_{\sigma_{ki}}, t_{\sigma_{ki}} | s_{\sigma_{k(i-1)}}, t_{\sigma_{k(i-1)}}) P(t_{n_k+1} > t_{max} | s_{n_k}, t_{n_k}),$$

where $\pi(s_{\sigma_{ki}}, t_{\sigma_{ki}}) = \emptyset(t_1' > t_{max})$ if $n_k=0$. The index matrix $\sigma=(\sigma_{ki}, k=1, \ldots K, j=1, \ldots, n_k)$ can be equivalently expressed as a graph G=(E,S) with n+2 nodes, where each observation corresponds to a node $S_i$, i=1, ..., n and adding a seed node ($S_0$) and a target node ($S_{n+1}$).

$$p(s, t | E) = \prod_{\substack{(i,j) \in E, \\ i=0, j \leq n}} \pi(s_i, t_j) \prod_{\substack{(i,j) \in E, \\ i>0, j \leq n}} p(s_j, t_j | s_i, t_i)$$

$$\prod_{\substack{(i,j) \in E, \\ i>0, j=n+1}} P(t'_{i+1} > t_{max} | s_i, t_i) \prod_{\substack{(i,j) \in E, \\ i=0, j=n+1}} \Pi(t'_1 > t_{max}).$$

Note that this probability is equivalent to Equation (9) only if every node i, i=1, ..., n has exactly one parent and one child, so that no event is used in two different Markov chains. Writing the edges in the form of a binary matrix: $E \in {0,1}^{(n+2) \times (n+2)}$, these constraints can be expressed by linear equalities:

$$\sum_{i=0}^{n+1} E_{ij} = 1 \quad \forall j \in \{1, \ldots, n\} \quad (10)$$

$$\sum_{j=0}^{n+1} E_{ij} = 1 \quad \forall i \in \{1, \ldots, n\} \quad (11)$$

The goal is to recover the most probable series of events. This means solving the expression:

$$\hat{E} = \underset{E \in \mathcal{E}}{\operatorname{argmax}} p(E | s, t, \theta) = \underset{E \in \mathcal{E}}{\operatorname{argmax}} \log p(s, t | E, \theta) + \log p(E) \quad (12)$$

From the previous definition, log p(s,t|E) is a linear combination of individual terms $E_{ij}$, $w_{ij}$ where the weights $w_{ij}$ are:

$$w_{ij} = \begin{cases} \pi(s_i, t_j) & \text{if } i=0, j \leq n \\ p(s_j, t_j | s_i, t_i) & \text{if } i>0, j \leq n \\ P(t'_{i+1} > t_{max} | s_i, t_i) & \text{if } i>0, j=n+1 \\ \prod (t'_1 > t_{max}) & \text{if } i=0, j=n+1 \end{cases}$$

Assuming a uniform prior distribution on the graphs $p(E) \propto C^{ie}$, the maximization of log log $p(s,t|E)$ relative to $E \in 0,1^{(n+2) \times (n+2)}$ under the previous constraints leads to an integer programming problem. In fact, the problem is an optimal assignment problem in a bipartite graph. Such a problem can be solved in strongly polynomial time. This algorithm is given in the next section.

It should be noted that the number of individual print flows is a byproduct of the method. It can be computed by counting the number of connected components in $\hat{E}$. This is an advantage over other clustering approaches, such as mixture models, where the number of components has to be known in advance.

3.1 Exemplary Print Process Recovery Algorithm for Probabilistic Optimal Assignment Method Input parameters: $\epsilon, \lambda, \alpha_1, \beta_1, \alpha_2, \beta_2$ Observe: $(s_i, t_i, u_i)$ for $i=1, \ldots, n$ where $S_i$ defines whether an observation i is a job submission or a document collection time, $t_i$ are the event times, $u_i$ is the index of the user which creates event i. If the user is unknown, then $u_i=0$.

Define:

$$w_{ij} = \begin{cases} -\log p(s_j|s_i) - \log p(t_j|s_j, sw_i, t_i) & \text{if } i, j \leq n \text{ and } (u_j = 0 \text{ or } u_i = u_j) \\ -\log \pi(s_j|s_i) & \text{if } i = n+j \\ -\log P(t'_{i+1} \geq t_{max}|t_i, s_i) & \text{if } j = n+i \\ \infty & \text{otherwise} \end{cases}$$

The indices $n+1, \ldots, 2n$ correspond to "virtual" events, meaning that they correspond to events that will never happen. This mathematical trick is used to ensure that every observed event is linked at a later time by exactly one event (observed or virtual). This explains the equalities constrained in Eqn. (14).

For $i=, \ldots, 2n$ and $j=1, \ldots, 2n$ where $p(s_j|s_i)$ is defined in Equation (4), $p(t_j|s_j,s_i)$ is defined in Equation (7), and $$P(t'_{i+1} \geq t_{max}|t_i, s_i) = \int_{t_{max}}^{\infty} p(t_{i+1} = \tau|t_i, s_i) d\tau \cdot \tau$$

is the integration variable (a scalar).

Solve the Optimal Assignment Problem:

$$\min_{E \in \{0,1\}^{n \times 2n}} \sum_{i=1}^{n} \sum_{j=1}^{2n} w_{ij} E_{ij} \quad (13)$$

$$\text{such that } \begin{array}{l} \sum_{i=1}^{n} E_{ij} = 1 \; \forall j = 1, \ldots, 2n \\ \sum_{j=1}^{2n} E_{ij} = 1 \; \forall i = 1, \ldots, n \end{array} \quad (14)$$

This integer programming problem is an optimal assignment problem in a bipartite graph G=(S,E) and can be solved in polynomial time by the Hungarian method (also known a Kuhn-Munkres algorithm). The complexity is $O(|E||S|^2)$ where $|E|$ is the number of edges in the graph (smaller than $n^2/2$) and $|S|$ is the number of nodes in the graph. (see, e.g., A. Frank, On Kuhn's Hungarian Method—a Tribute from Hungary. Technical Report 2004-14, Egrervary Research Group, Pazmany P. Setany 1/C, H1 117, Budapest, Hungary, (2004). The standard Hungarian method is defined for square matrices and a slight modification extends it to rectangular matrices (See, Francois Bourgeois and Jean-Claude Lassalle, An Extension of the Munkres Algorithm for the Assignment Problem to Rectangular Matrices. *Communications of the ACM*, 14(12):802-804 (December 1971).

Output:

$E_{ij}=1$ with j<n means that event i is followed by event j.

$E_{ij}=1$ with j>n means that event next to i has not been observed before $t_{max}$.

The time-to-collect durations are $t_j-t_i$ for all pairs (i,j) such that $E_{ij}=1$ and $s_i=1$ and $s_j=2$. The expected time-to-collect is estimated as the average of these durations.

It can be shown that the algorithm above in Eqns. 13 and 14 for the Probabilistic Optical Assignment Method is equivalent to that defined above in Eqns. 1, 2, and 3 for the Optical Assignment Method if truncated normal distributions with 0 mean and unit variance are used instead of exponential and log-normal distributions.

3.2 Parameter Estimation

In the above algorithm, estimates for the value of the parameters $\theta=(\epsilon, \lambda, \alpha_1, \beta_1, \alpha_2, \beta_2)$ are needed. These parameters can be set manually using prior knowledge about the infrastructure usage or learned automatically using a maximum a posteriori (MAP) estimator:

$$\hat{\theta} = \underset{\theta \in \Theta}{\text{argmax}} \left( \frac{\max p(s, t, E, \theta)}{E} \right) \quad (15)$$

$$= \underset{\theta \in \Theta}{\text{argmax}} \left( \frac{\max \log p(s,t,E,\theta)}{E} \right) + \log p(\theta) \quad (16)$$

where $p(\theta)$ characterizes the prior knowledge on the parameters. If no prior knowledge is available, then a non-informative prior can be chosen.

Assume that the values of the matrix $E_{ij}$ are known. Then, the MAP estimation of the parameters $\theta$ is straightforward. Assuming a uniform prior, the parameter $\epsilon$ is simply the proportion of transitions from job submissions to document collection:

$$\hat{\epsilon} = \frac{a_\epsilon - 1 + \sum_{i=1}^{n} \sum_{j=1}^{n} E_{ij} I_{\{s_i>0, s_j=0\}}}{\sum_{i=1}^{n} \sum_{j=1}^{n} E_{ij} I_{\{s_i>0\}} + a_\epsilon + b_\epsilon - 2} \quad (17)$$

where it can be assumed that the prior distribution of $\epsilon$ is a Beta distribution with parameters $a_\epsilon$ and $b_\epsilon$ (set to 1 for a uniform prior).

The parameter $\lambda$ is the MAP estimate of the exponential distribution:

$$\hat{\lambda} = \frac{\sum_{i=1}^{n} \sum_{j=1}^{n} E_{ij} I_{\{s_i>0, s_j>0\}} + a_\lambda}{\sum_{i=1}^{n} \sum_{j=1}^{n} (t_j - t_i) E_{ij} I_{\{s_i>0, s_j>0\}} + b_\lambda} \quad (18)$$

where it can be assumed that the prior distribution of $\lambda$ is a Gamma distribution with parameters $a_\lambda$ and $b_\lambda$.

The parameters $\alpha_1$ and $\beta_1$ are the MAP estimates of the parameters of a log-normal distribution with observed data sample $\tau_1=\{t_j-t_i, \forall(i,j) \text{ such that } E_{ij}=1, s_i>0, s_j=0\}$ and the right-truncated data sample $\tau_1^{tr}=\{t_{max}-t_i, \forall(i,j) \text{ such that } E_{ij}=1, j>n, s_i>0\}$. The MAP estimation is found using a non-linear optimization method to solve:

$$(\hat{\alpha}_1, \hat{\beta}_1) = \underset{a>0, \beta>0}{\text{argmax}} L(a, B; \tau_1, \tau_1^{tr}) \quad (19)$$

with $$L(a, \beta, \tau_1, \tau_1^{tr}) =$$
$$\log p(a, B) + \sum_{i=1}^{|\tau_1|} \log p(\tau_1 \mid a, \beta) + \sum_{i=1}^{|\tau_1^{tr}|} \log P(t > \tau_i^{tr} \mid a, \beta)$$

where $p(\alpha,\beta)$ can be any differentiable probability distribution,
$p(\tau|\alpha,\beta)=(\alpha_1\tau)^{\beta_1-1}e^{(\alpha_1\tau)^{\beta_1}}$ is the log-normal pdf, and
$P(\rho|\alpha,\beta)=1-e^{(\alpha_1\tau)^{\beta_1}}$ is the log-normal cdf.

The parameters $\alpha_2$ and $\beta_2$ are estimated similarly using the data samples:
$\tau_2=\{t_j-t_i, \forall(i,j) \text{ such that } E_{ij}=1, s_i=0, s_j=0\}$ and $\tau_1^{tr}=\{t_{max}-t_i, \forall(i,j)\} \text{ such that } E_{ij}=1, j>n, s_i=0$
Then, $$(\hat{a}_2, \hat{\beta}_2) = \underset{a>0, \beta>0}{\text{argmax}} L(a, \beta, \tau_2, \tau_2^{tr}) \quad (20)$$

where the log-normal pdf and cdf are replaced by a Weibull pdf and cdf in the expression of L.

A local maximum of the problem in Eqn. (15) can be found using a simple iterative algorithm iterating the two maximizations:

initialize $\theta^{(0)}$ at the default values for the parameters of the distributions.

For l=1, 2, . . . , iterate until convergence:
1. Solve $E^{(l+1)}=\text{argmax}_E \log p(s,t,E|\theta^{(l)})$ using the Print Process Recovery Algorithm above.
2. Solve $\theta^{(l+1)}=\text{argmax}_{\theta \in \Theta} \log p(\theta,s,t|E^{(l+1)})$ using formulas (17), (18), (19) and (20).

D. EXAMPLE APPLICATIONS

Specific examples in which the Expected Time-to-Collect measure finds application will now be described.
1. Optimizing Placement of Printers The Expected Time-to-Collect measure may be used to make an estimation of the appropriateness of having a given printer model at a certain place in the office. If the ETC for a given printer is large, then it may not be useful to have a very high speed printer at that location. Conversely, if the printer in place is not a high speed machine and the ETC for the printer is low, then consideration may be given to changing the printer for a faster one to improve productivity. The measure can help the manager of a fleet of devices to make decisions on (re-) allocation of devices and when purchasing new devices. Since the measure can vary over time, it can be periodically reestimated so that appropriate changes in logistics can be done to adapt to the working environment.

2. Job Rescheduling

Print jobs may be proposed for rescheduling or redirection if statistical information about the ETC is available. For example, if a very large job is sent to a printer which has a short ETC, then, depending on the current status of the printer queue, the large job could be a candidate for redirection to another printer. This may be the subject of a negotiation with the user who has sent the print request. The ETC information would give a higher confidence with respect to the appropriateness of the schedule change.

3. Print Infrastructure Monitoring

Where an infrastructure for detecting the identity of the users is in place, the information on the Time-to-Collect could be used, in combination with logged information on walks to the printer of the users, to detect non-optimal printer usage and behavior, e.g., detecting that people have to walk several times to the printer before being able to collect a print job.

4. Power Saving

If an ETC for a submitted job is relatively long, then a decision may be made for printer which is in a power saving mode which is that the printer should not be brought into its operational mode in order to print the job. Rather, a decision may be made to wait until there are several jobs awaiting printing for that printer such that at least one of the jobs in the queue is approaching its estimated time to collect. Then, the printer may be brought into its operational mode for printing all the jobs in the queue.

Without intending to limit the scope of the exemplary embodiment, the Example below illustrates the exemplary method.

EXAMPLE

The computation seeks to determine the Expected Time-to-Collect (ETC), which in this example is expressed as the average time people take to collect their document. Random time periods of length 2 hours were selected where at least 5 different persons printed on the same device. The sensor detection was simulated using a lognormal distribution with parameters log(2) and √(2*log(2)) (mean=4 minutes, standard deviation=6.9). If the same user printed more than 1 job in a one minute interval, then no collection time was simulated (to model successive prints). In addition noisy sensor observations were added (representing 0%, 10% and 33% of the collection times, respectively). This experiment was repeated 1000 times for different devices and different time periods.

Despite use of unoptimized Matlab code, the learning was extremely fast: it required 0.1 second per experiment on average. This is mainly due to the fact that the number of jobs is relatively small (15 on average). For 150 print jobs (more than one week of printer usage for heavily used printers), the learning time takes typically 1 minute. Hence, the performance is not an issue since the algorithm can be launched independently every day. Table 3 shows the results for no noise, 10% noise level, and 33% noise level, respectively. The results are averaged over 1000 independent experiments.

TABLE 3

| | Mismatch Error (%) | | | Average ETC Noise | | | Average ETC Relative Error (%) | | |
|---|---|---|---|---|---|---|---|---|---|
| | No noise | 10% | 33% | No noise | 10% | 33% | No noise | 10% | 33% |
| ground truth | 0.0 | 0.0 | 0.0 | 4.0 | 4.0 | 3.9 | 0.0 | 0.0 | 0.0 |
| Minimal time method (Baseline) | 72.8 | 77.1 | 87.6 | 3.0 | 3.0 | 2.7 | 38.6 | 44.9 | 60.1 |
| Optimal Assignment Method | 39.7 | 42.7 | 51.2 | 3.5 | 3.4 | 3.0 | 13.9 | 21.0 | 41.1 |
| Probabilistic Optimal Assignment Method | 33.3 | 38.2 | 50.9 | 3.8 | 3.6 | 3.2 | 6.0 | 12.8 | 32.1 |

The 'Mismatch Error' column represents the number of assignment errors that have been made compared to the ground truth. For each simulation, an ETC value was estimated. The 'Average ETC and 'Average ETC Relative Error' columns give the average over all these estimations. As expected, all methods decreased in accuracy as the noise level increased. The optimal assignment method gives much more accurate results that the naive minimal time method. The bias of the estimation is relatively small, since the Expected Time-to-Collect is estimated to be 3.6 in the 10% noise case, compared to the ground truth which is 4. It may also be noted that the probabilistic modeling approach (probabilistic optimal assignment method) significantly improves the performance of the original algorithm (Optimal Assignment Method): the error in the computation of ETC is halved for the 'no noise' case and the '10% noise' case.

In summary, there is disclosed herein a method to recover the full sequence of print events based on partial observations coming from a sensor which detects people collecting their printed document. The method is based on the simple assumption that a collection time is likely to correspond to exactly one user that submitted a job recently. More complex models could, of course be used to account for other user behaviors. The underlying probabilistic model is flexible and its parameters can be automatically tuned from observations.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for computing an expected time-to-collect for a print job comprising:
   inputting submission event data for the print job, the submission event data comprising at least one feature of the print job selected from a set of features;
   computing an expected time-to-collect for the print job based on the submission event data and learned parameters of a model, the model being one which has been generated from time-to-collect data for prior print jobs and features of the prior print jobs; and
   outputting the expected time-to-collect for the print job.

2. The method of claim 1, wherein the at least one feature is selected from the group consisting of a submitter identifier, a submission time, a printer identifier, a number of requests submitted at one time, a document type, a printer proximity, a submitter role, and combinations thereof.

3. The method of claim 1, wherein the at least one feature comprises a submitter identifier, a submission time, and at least one additional feature of the print job.

4. The method of claim 1, further comprising generating the model, including:
   acquiring prior event data for submission and collection events related to submitted prior print jobs, the prior event data including:
      submission event data for a plurality of prior print jobs submitted for printing on a printer comprising, for each submitted print job, a submission time, an identifier which identifies a submitter of the submitted print job, and at least one feature of the print job, and
      collection event data comprising a plurality of recorded collection times, each of the plurality of collection times corresponding to the collection of at least one prior print job from the printer;
   computing time-to-collect data for the prior event data, including, for each of a plurality of the submitted prior print jobs, linking a submission time to a recorded collection time and computing a time-to-collect as the difference between the linked submission and collection times; and
   learning parameters of the model based on the features of the prior print jobs and time-to-collect data.

5. The method of claim 4, wherein the collection event data and submission event data are acquired in overlapping time windows.

6. The method of claim 4, wherein the collection event data retains the anonymity of collectors collecting the print jobs.

7. The method of claim 4, wherein the linking includes, for a plurality of collection and submission events, generating an optimal assignment of linked events, based on a most probable difference in the event times.

8. The method of claim 7, wherein the optimal assignment of linked events seeks to satisfy the following conditions:
   a submission event is only linked to another submission event having the same submitter identifier; and
   a submission event is only linked to a collection event that has a later time.

9. The method of claim 7, wherein the optimal assignment of linked events seeks to satisfy the following conditions:
   a submission event is only linked to another submission event having the same submitter identifier; and
   a submission event is only linked to a collection event that has a later time.

10. The method of claim 8, wherein the optimal assignment satisfies a relationship over all pairs of events i and j:

$$\min_{E \in \{0,1\}^{n \times 2n}} \sum_{i=1}^{n} \sum_{j=1}^{2n} w_{ij} E_{ij},$$

such that:

$$\sum_{i=1}^{n} E_{ij} = 1 \ \forall \ j = 1, \ldots, n$$

$$\sum_{j=1}^{n} E_{ij} = 1 \ \forall \ i = 1, \ldots, n$$

where $w_{ij}$ represents a weight which is a function of a difference in time between events i and j, where the conditions for linking events i and j are satisfied,
n represents the number of events in the considered time period; and
E represents the assignment matrix and $E_{ij}=1$ if event i is linked to event j if $j \leq n$ or is not linked to any posterior event if $j > n$.

11. The method of claim 10, wherein:

$$w_{ij} = \begin{cases} (t_j - t_i)^2 I_{\{t_j > t_i\}} & \text{if } u_j = 0 \text{ or } u_i = u_j \\ \infty & \text{otherwise} \end{cases}, \quad (3)$$

$t_i$ represents the time of the first event I,
$t_j$ represents the time of the second event j,
I is the indicator function such that if $t_j > t_i$, then I=1, otherwise 0,
$u_i$ represents the user index for event i, and
$i_j$ represents the user index for event j.

12. The method of claim 10, wherein:
$w_{ij}$ represents a weight which is a function of both the difference in time between event i and j and the nature of the linked events i and j.

13. The method of claim 1, wherein the set of features includes user-related features and print job-related features.

14. The method of claim 1, further comprising outputting a decision based on the expected time to collect.

15. The method of claim 14, wherein when the expected time-to-collect of the pending print job is longer than an expected-time-to collect for another pending print job, the decision comprises permitting the other print job to be printed first.

16. The method of claim 1, further comprising detecting whether there is non-optimal usage of a printer based on the expected time to collect.

17. The method of claim 16, wherein the printer is a network printer which is accessible to a plurality of users and the submission event data comprises submission times for print jobs submitted by a plurality of users.

18. A computer program product encoding instructions, which when executed on a computer causes the computer to perform the method of claim 1.

19. A method of generating a model for determining an expected time-to-collect for at least one print job comprising:
acquiring event data for submission and collection events related to submitted prior print jobs, the event data including:
submission event data for a plurality of prior print jobs submitted for printing on a printer comprising, for each submitted print job, a submission time and an identifier which identifies a submitter of the submitted print job, and
collection event data comprising a plurality of recorded collection times each of the plurality of collection times corresponding to the collection of at least one prior print job from the printer;
based on the event data, computing a time-to-collect for at least one of the plurality of submitted prior print jobs; and
generating a model based on the computed time-to-collect computed for a plurality of prior print jobs, the model configured for outputting an expected time-to-collect based on input submission event data.

20. The method of claim 19, further comprising linking a submission time to a collection time and computing a time-to-collect as the difference between the linked submission and collection times, the time-to-collect being based on the computed time-to-collect.

21. The method of claim 20, wherein the linking includes, for a plurality of collection and submission events, generating an optimal assignment of linked events, based on a difference in the event times.

22. The method of claim 19, further comprising deriving an expected time-to-collect for a pending print job, by inputting submission event data for the pending print job to the model.

23. A computer implemented system for determining an expected time-to-collect for a print job comprising:
a component for acquiring a submission time for the print job and at least one job feature; and
a model which outputs an expected time-to-collect for the print job based on the acquired submission time and time-to-collect data and job features of prior print jobs.

24. The system, of claim 23, further comprising a component for acquiring collection times, each collection time corresponding to the collection of at least one prior print job from the printer and a component which links the collection time to a submission time of a prior print job and computes the time-to-collect therefrom.

25. The system, of claim 23, further comprising a sensor associated with the printer which provides sensor data representative of a collection of a print job to the component for acquiring collection times.

26. The system of claim 23, further comprising a decision component which outputs a decision for the print job based on the expected time-to-collect.

27. A network printing system comprising the computer implemented system of claim 23 and further including at least one printer and a plurality of workstations from which print jobs are submitted to the printer, the workstations being linked to the at least one printer by a network.

28. A method for recovering a sequence of print events based on partial observations comprising:
acquiring event data for a plurality of submission events comprising submission times for a plurality of print jobs submitted to a printer via a network which is accessible to a plurality of submitters;
acquiring event data for a plurality of collection events comprising sensed data representative of times at which print jobs are collected from the printer, the collection times and submission times being acquired in overlapping time windows;
where a submitter that collects the print job is not uniquely identified, the method includes processing the acquired submission times and collection times with an algorithm which provides an optimal assignment of links between print events, each of the print events comprising one of a submission event and a collection event, the optimal assignment taking into consideration a difference in time between each linked pair of submission times where the pair is attributed to the same submitter, and each linked submission time and collection time, where the collection time is later in time than the submission time; and based on the optimal assignment, recovering a sequence of the print events.

29. The method of claim 28, further comprising, computing a time-to-collect for at least some of the plurality of print jobs from their submission and collection times, based on the recovered sequence.

30. The method of claim 29, further comprising computing an average expected time-to-collect for the plurality of print jobs.

31. A method for computing an expected time-to-collect for a print job comprising:

inputting submission event data for the print job to a model, the submission event data comprising at least one feature of the print job selected from a set of features, the model being one which has been generated from time-to-collect data for prior print jobs and features of the prior print jobs; and outputting an expected time-to-collect for the print job.

* * * * *